(12) United States Patent
Zhang et al.

(10) Patent No.: US 8,912,107 B2
(45) Date of Patent: Dec. 16, 2014

(54) COMPOSITION FOR PREPARING HIGH-PERFORMANCE GLASS FIBER BY TANK FURNACE PRODUCTION

(75) Inventors: Yuqiang Zhang, Tongxiang Zhejiang (CN); Guorong Cao, Tongxiang Zhejiang (CN); Bing Zhang, Tongxiang (CN); Lin Zhang, Tongxiang (CN); Wenzhong Xing, Tongxiang (CN); Guijiang Gu, Tongxiang (CN)

(73) Assignee: Jushi Group Co., Ltd., Tongxiang, Zhejiang (CN)

( * ) Notice: Subject to any disclaimer, the term of this patent is extended or adjusted under 35 U.S.C. 154(b) by 149 days.

(21) Appl. No.: 13/698,259

(22) PCT Filed: May 18, 2011

(86) PCT No.: PCT/CN2011/074283
§ 371 (c)(1),
(2), (4) Date: Nov. 30, 2012

(87) PCT Pub. No.: WO2011/144032
PCT Pub. Date: Nov. 24, 2011

(65) Prior Publication Data
US 2013/0203583 A1 Aug. 8, 2013

(30) Foreign Application Priority Data
May 19, 2010 (CN) .......................... 2010 1 0176217

(51) Int. Cl.
C03C 3/087 (2006.01)
C03C 3/091 (2006.01)
C03C 13/00 (2006.01)
C03C 13/06 (2006.01)

(52) U.S. Cl.
CPC ................ *C03C 13/00* (2013.01); *C03C 3/091* (2013.01); *C03C 13/06* (2013.01); *C03C 3/087* (2013.01)

USPC .................. 501/70; 501/66; 501/35; 501/36; 501/38

(58) Field of Classification Search
CPC ........ C03C 13/00; C03C 13/02; C03C 13/06; C03C 3/087; C03C 3/091
USPC ...................................... 501/35, 36, 38, 66, 70
See application file for complete search history.

(56) References Cited

U.S. PATENT DOCUMENTS

| | | | | |
|---|---|---|---|---|
| 4,199,364 | A * | 4/1980 | Neely .............................. | 501/35 |
| 6,818,575 | B2 * | 11/2004 | Wallenberger .................. | 501/35 |
| 7,531,475 | B2 * | 5/2009 | Kishimoto et al. ............. | 501/69 |
| 8,304,484 | B2 * | 11/2012 | Fujiwara et al. ............... | 524/494 |
| 8,338,524 | B2 * | 12/2012 | Fujiwara et al. ............... | 524/494 |
| 8,450,226 | B2 * | 5/2013 | Lewis ............................. | 501/72 |
| 2007/0087139 | A1 * | 4/2007 | Creux et al. ................ | 428/32.71 |
| 2009/0286440 | A1 * | 11/2009 | Lecomte et al. .............. | 442/181 |
| 2010/0045164 | A1 * | 2/2010 | Fechner et al. ................ | 313/493 |
| 2014/0113799 | A1 * | 4/2014 | Han ................................ | 501/38 |

* cited by examiner

*Primary Examiner* — Karl Group
*Assistant Examiner* — Elizabeth A Bolden
(74) *Attorney, Agent, or Firm* — Lewis Brisbois Bisgaard & Smith LLP; Jon Hokanson

(57) ABSTRACT

A composition for preparing high-performance glass fiber by tank furnace production comprising in preferred percentage by weight: 57.5~62.5% of $SiO_2$, 14.5~17.5% of $Al_2O_3$, 13.5~17.5% of CaO, 6.5~8.5% of MgO, 0.05~0.6% of $Li_2O$, 0.1~2% of $B_2O_3$, 0.1~2% of $TiO_2$, 0.1~2% of $Na_2O$, 0.1~1% of $K_2O$ and 0.1~1% of $Fe_2O_3$ and (CaO+MgO)/MgO>3, with the content of at least one of the three components, $A_2O$, $B_2O_3$ and $TlO_2$ higher than 0.5%, with the composition yielding glass fiber having improved mechanical property, causing the melting and clarification of glass and forming performance of fiber close to those of boron-free E glass, and facilitating industrial mass production by tank furnace processes with manufacturing costs close to those of conventional E glass.

6 Claims, No Drawings

COMPOSITION FOR PREPARING HIGH-PERFORMANCE GLASS FIBER BY TANK FURNACE PRODUCTION

CROSS REFERENCE TO RELATED APPLICATIONS

This application claims the benefit of Chinese Application 201010176217.X, filed May 19, 2010 and International Application PCT/CN2011/074283, filed May 18, 2011, both of which are incorporated by reference herein.

FIELD OF INVENTION

The invention relates generally to compositions for preparing glass fiber, in particular to compositions for preparing high-performance glass fiber by tank furnace production methods.

BACKGROUND

Glass fiber is an inorganic fiber material that is useful to reinforce organic polymer materials that in turn are used to prepare high-performance composites or to reinforce inorganic materials, such as cement, for road construction. The production of glass fiber, a special glass, has been difficult. Therefore, the usage amount of glass fiber is restrained due to its relatively high production cost. The introduction of the tank furnace in 2000 has caused a breakthrough in the art of mass production of glass fiber, by significantly reducing the cost of mass production of glass fiber, thus expanding the fields of application for and usage amounts of glass fiber since then. However, limitations due to the heating method and refractory material associated with tank furnaces, production of glass fiber by tank furnace methods of production require that the high temperature viscosity of the glass composition is limited, that is, it should not be too high. Generally, the forming temperature of a glass composition should be less than 1300° C., and at least 50° C. higher than its liquidus temperature.

The standard glass composition for preparing continuous glass fiber, commonly known as "E" glass, includes the following components in percentage by weight as per the ASTM D578-00 Standard: 0-10% of $B_2O_3$, 16-25% of CaO, 12-16% of $Al_2O_3$, 52-62% of $SiO_2$, 0-5% of MgO, 0-2% of alkali oxide, 0-1.5% of $TiO_2$, 0.05-0.8% of $Fe_2O_3$ and 0-1% of $F_2$. Melting, clarification and fiber drawing can be done to E glass at low temperature. The forming temperature is generally lower than 1280° C., which meets the requirements of mass production by tank furnace. Production of E glass began approximately in 1940. However, E glass remains the composition of over 90% of glass fiber produced around the world.

In the 21$^{st}$ century, as science and technology develops, improvement of the performance of fiber-reinforced composites is required, thereby requiring glass fiber having better performance characteristics than prior glass fiber. Ordinary E glass fiber, which contains about 7% of $B_2O_3$ in percentage by weight, has been unable to meet the performance demands in certain fields of use, including, for example manufacturing of wind turbine blades, high-performance GRP (Glass Reinforced Pipe(s)) and automobile components due to its relatively poor mechanical properties, particularly its monofilament strength.

Boron-free E glass fiber is known, as described for example in U.S. Pat. No. 5,789,329 ("the '329 patent publication"), and improved E glass fiber is known, as described in U.S. Pat. No. 6,136,735 ("the '735 patent publication"). While the boron-free E glass fiber and improved E glass fiber described in those two patents have relatively better mechanical performance than ordinary E glass fiber, neither meet the demands required in such special fields of use as wind turbine blades and high pressure pipes.

Compositions of high-performance glass fiber are known and described, for example, in U.S. Pat. No. 3,402,055 ("the '055 patent" or "the '055 patent publication"), France Patent FR-A-1,435,073 ("the French '073 patent publication") and Chinese Patent Application CN94111349.3 ("the Chinese '349 publication"). The main component of the high-performance glass fiber described in each of these three patent publications is $SiO_2$—$Al_2O_3$—MgO or $SiO_2$—$Al_2O_3$—CaO—MgO, each of which is different from $SiO_2$—$Al_2O_3$—CaO—$B_2O_3$, the main components or ingredients of E glass fiber. Although the glass fibers described in these three patent publications have relatively great mechanical strength and high modulus, the requirements of mass production by tank furnace can not be fulfilled presently.

To be specific, the molding or forming temperature of typical S-2 glass fiber, as described in the '055 patent, exceeds 1500° C., and the molding or forming temperature of R glass fiber, as described in the French '073 patent publication is about 1410° C. The temperatures for melting, clarification and wire drawing operations of these two glass fibers are extremely high and exceed the maximum temperatures that can be reached during tank furnace production. The Chinese '349 patent publication describes a high-performance #2 glass fiber whose forming or molding temperature is about 1245° C., but it liquidus temperature reaches 1320° C. Thus, for the Chinese '349 patent publication glass fiber, the $\Delta T$ (the difference between the forming temperature and the liquidus temperature) is −75° C. However, in general a positive $\Delta T$ value exceeding 50° C. is required during tank furnace production. Therefore, the glass fibers described in these three patent publications are not suitable for mass production by tank furnace production processes.

Due to the restrictions related to production mode or to failure to achieve mass production of high-performance glass fiber by tank furnace methods of manufacturing, the manufacturing costs and ultimate prices of high-performance glass fibers are extremely high, thereby seriously affecting the total output relative to demand. As a consequence, high-performance glass fiber is typically used only in such fields as aviation, aerospace, national defense, military and the like. There is a high demand for high performance glass fiber in relatively new industries and applications, such as blades for high-power wind turbines, high pressure pipe lines and pressure vessels, for which current production levels of high-performance glass fiber can not meet the demand.

SUMMARY

The compositions and processes described herein overcome the drawbacks of known compositions and processes for manufacturing high-performance glass fiber by providing improved compositions and methods of manufacturing high-performance glass fiber.

In accordance with the above mentioned objectives and principles, a preferred composition for preparing high-performance glass fiber contains $SiO_2$, $Al_2O_3$, CaO, MgO, $Li_2O$, $B_2O_3$, $TiO_2$, $Na_2O$, $K_2O$ and $Fe_2O_3$, the relative proportions of which are listed below by weight percentage:

| | |
|---|---|
| SiO$_2$ | 57.5~62.5% |
| Al$_2$O$_3$ | 14.5~17.5% |
| CaO | 13.5~17.5% |
| MgO | 6.5~8.5% |
| (CaO + MgO)/MgO | >3 |
| Li$_2$O | 0.05~0.6% |
| B$_2$O$_3$ | 0.1~2% |
| TiO$_2$ | 0.1~2% |
| Na$_2$O | 0.1~2% |
| K$_2$O | 0.1~1% |
| Fe$_2$O$_3$ | 0.1~1% |

Also, the percentage content of at least one of the three components—Li$_2$O, B$_2$O$_3$ and TiO$_2$ should be higher than 0.5%, and within the ranges listed above.

These and other embodiments, features, aspects, and advantages of the invention will become better understood with regard to the following description, appended claims and accompanying drawings.

DETAILED DESCRIPTION

Described herein are compositions and processes for preparing high-performance glass fiber that address the problems associated with known high-performance glass fiber production methods. These compositions and processes are based on maintaining high mechanical properties of the resulting glass fiber, and on causing the melting, clarification and forming performance of glass fiber to be close to those of boron-free E glass. The presently described compositions and processes also facilitate industrial mass production by tank furnace and with manufacturing costs close to that of conventional E glass.

As is well known by those skilled in the field glass fiber manufacturing, four basic parameters are typically used to specify the characteristics and describe advantages of specific glass fiber compositions:

1. Forming or Molding Temperature. The forming temperature is the temperature when the viscosity of the molten glass is 10$^3$ poise/h.
2. Liquidus Temperature. The liquidus temperature is the temperature when the molten glass cools off and starts to form a crystal nucleus, i.e., the maximum temperature of glass devitrification.
3. ΔT value. ΔT value is the difference between the forming temperature and liquidus temperature, indicating the possible temperature range for fiber drawing and formation.
4. Monofilament strength. Monofilament strength is the bearable drawing force of monofilament fineness of glass fiber.

The above four basic parameters and measurement methods are well known to those skilled in this field. As will be shown, the presently described glass fiber compositions have a much lower forming temperature and liquidus temperature than conventional S glass. These lower forming temperatures yield numerous advantages, such as meeting the requirements for tank furnace production processes; helping to lower energy consumption; reducing the risk of corrosion of furnace fireproofing materials; and reducing aging of the furnace's crucible well during operation at high temperatures. Compared with traditional E glass, the present glass fibers have much higher monofilament strength. As a result, the presently described compositions provide advantageous balances among the founding and fiber drawing performance of the glass during production, advantageous mechanical properties of the resulting glass fiber, and facilitate industrial mass production by tank furnace production processes.

In accordance with the above mentioned objectives and principles, a preferred composition for preparing high-performance glass fiber contains SiO$_2$, Al$_2$O$_3$, CaO, MgO, Li$_2$O, B$_2$O$_3$, TiO$_2$, Na$_2$O, K$_2$O and Fe$_2$O$_3$, the relative proportions of which are listed below by weight percentage:

| | |
|---|---|
| SiO$_2$ | 57.5~62.5% |
| Al$_2$O$_3$ | 14.5~17.5% |
| CaO | 13.5~17.5% |
| MgO | 6.5~8.5% |
| (CaO + MgO)/MgO | >3 |
| Li$_2$O | 0.05~0.6% |
| B$_2$O$_3$ | 0.1~2% |
| TiO$_2$ | 0.1~2% |
| Na$_2$O | 0.1~2% |
| K$_2$O | 0.1~1% |
| Fe$_2$O$_3$ | 0.1~1% |

Also, the percentage content of at least one of the three components—Li$_2$O, B$_2$O$_3$ and TiO$_2$ should be higher than 0.5%, and within the ranges listed above.

SiO$_2$ is the main oxide for forming the base of glass and plays a role in stabilizing other components. The mass percent of SiO$_2$ in a preferred embodiment ranges from 57.5~62.5%. Excessively low content of SiO$_2$ leads to lowered mechanical properties of the resulting glass and magnifies the glass's tendency towards devitrification. Also, too much SiO$_2$ will cause high viscosity, thus leading to difficulties in melting, clarification and subsequent fiber drawing of the resulting glass. The most preferred SiO$_2$ content ranges from 58~60.5%.

As an important glass network intermediate oxide, the preferred range of Al$_2$O$_3$ content is 14.5-17.5%, and the most preferred range is 15.5-16.5%. In the presently described compositions and processes most of the Al$_2$O$_3$ enters into the glass network in form of AlO$_4$, which combines with SiO$_2$, and plays an important role in determining the mechanical properties of the resulting glass and in preventing phase separation and devitrification. Lowering the content of Al$_2$O$_3$ lowers the mechanical properties and raises the liquidus temperature to a point where if the Al$_2$O$_3$ content is too low, the mechanical properties of the resulting glass fiber will be lowered to an unacceptable point and the liquidus temperature will be too high. Specifically, if the content of Al$_2$O$_3$ is too high, the network structure of the resulting glass will be broken by the eight-coordinate [AlO$_6$] and raise the temperature of glass devitrification.

In addition, the range of SiO$_2$+Al$_2$O$_3$ content in the preferred compositions is strictly specified, that is, the range is 73-80% by weight, which will ensure excellent mechanical properties and facilitate industrial mass production by tank furnace production processes.

CaO, as an important network modifying oxide, is especially effective in lowering the high-temperature viscosity of the glass. However, excessive CaO content tends to cause devitrification, and can results in separation of crystal from the glass, to form wollastonite. The preferred range of CaO content is 13.5-17.5%, and the most preferred range is 14-16% by weight.

MgO and CaO have similar functions in glass, but the field intensity of Mg$^{2+}$ is much higher than CaO and plays an important role in the improvement of glass strength and modulus. However, the disadvantage of MgO is that a high content of MgO will increase the tendency of the glass to devitrify, will increase the devitrification rate, and can result in the separation of crystal from the glass, to form malacolite.

The preferred range of MgO content is 6.5-8.5%, and the most preferred range is 6.5-7.8% by weight.

The preferred sum of the CaO and MgO percentages by weight is 20.5-23.5%, which results in lower liquidus temperature and lower forming temperature, thus meeting the requirements for glass flow in large tank furnace production processes and ensuring the best performance of the resulting glass fibers.

Also, the preferred ratio of (CaO+MgO)/MgO is greater than 3. This ratio has been found to improve the melting and clarification of the glass and to reduce the tendency towards devitrification of the glass. It is believed that this ratio functions to regulate and control devitrification and to lower the liquidus temperature through competition between $Mg^{2+}$ and $Ca^{2+}$ for anions. However, it is believed that the different radius and field intensity of Ca ion and Mg ions will cause a mixed alkaline earth effect, with the preferred weight percentages and preferred ratio of Ca and Mg content forming an accumulation pattern that will tighten the glass structure and strengthen the glass fiber. In addition, the preferred ranges of CaO and MgO will provide for a controllable devitrification rate, increased glass flow, improved production capacity and more suitable mass production by a tank furnace production method. The preferred ratio of $2.01 \le CaO/MgO \le 2.3$ contributes to obtaining the best results in terms of modulus, strength, liquidus temperature and mold temperature, and the most preferred range of this ratio is 2.01-2.1, which produces the best result.

Because the addition of $B_2O_3$ may result in a noticeable fluxing action, the presence of $B_2O_3$ will help lower the glass viscosity, improve the glass-forming ability and improve devitrification performance. Because high-performance glass is difficult to melt and form, adding a proper amount of $B_2O_3$ proves quite effective in improving the performance of glass melting and fiber drawing. However, the weight percentage of $B_2O_3$ in a composition should be chosen so as to avoid the risk of volatilization and pollutant emission. The preferred range of $B_2O_3$ content is 0.1-2% by weight, and the most preferred range is 0.6-1.5%.

It has been discovered that addition of $TiO_2$ will reduce the high-temperature viscosity of molten glass and accelerate melting. However, high content of $TiO_2$ will lead to an unfavorable yellow color of the glass and to greatly increased cost of raw material. The preferred range of TiO2 content therefore is 0.1-2%.

It has also been discovered that addition of $Na_2O$ and $K_2O$ can significantly reduce the high-temperature viscosity of molten glass and can accelerate melting and clarification of a glass batch. However, the weight percentage of $Na_2O$ and $K_2O$ should not be excessive, to avoid lowering the mechanical properties of the glass and lowering the chemical stability of the glass fiber. The preferred ranges of $Na_2O$ and $K_2O$ content are 0.1-2% and 0.1-1%, respectively.

It has been discovered that the addition of $Li_2O$ will lower the glass forming temperature and strengthen the mechanical strength of the glass more than addition of $Na_2$ and $K_2O$. However, $Li_2O$ will also increase the liquidus temperature and the devitrification rate. Also, the raw material price of $Li_2O$ is relatively high so that its weight percentage should be carefully controlled. The preferred range of $Li_2O$ content is 0.05-0.6% by weight.

The sum of the weight percentages of $Na_2O$, $K_2O$ and $Li_2O$ is preferably less than 2%.

It has been found that excessive percentages of $Li_2O$ will increase the liquidus temperature and the devitrification rate, but that a proper amount of $B_2O_3$ will reduce the negative consequences caused by the addition of $Li_2O$. Considering the effect of $B_2O_3$, $Li_2O$ and $Ti_2O$ on liquidus temperature, forming temperature and devitrification rate, the content of any one of them should be greater than 0.5% in order to provide relatively easier drawing and founding, and to better monofilament strength.

Addition of $Fe_2O_3$ can improve devitrification of the glass, and improve the strength and modulus of the glass fiber. However, because excessive ferric ion and ferrous ion will significantly tint the glass and lead to difficulty in glass melting, the weight percentage used should be limited. The preferred range of Fe2O3 content is 0.1-1% by weight.

In addition to the compositions described above, the compositions for making glass fiber can include a small amount of ZnO, 0.1-4% by weight which can, to some degree, reduce glass viscosity and improve its devitrification property and increase its chemical stability. However, excessive ZnO percentage will greatly increase the cost of raw material of the glass. The preferred range of ZnO content is 0.1-2% by weight.

In accordance with the principles set forth above an alternate composition for preparing high-performance glass fiber contains $SiO_2$, $Al_2O_3$, CaO, MgO, $Ll_2O$, $B_2O_3$, $TiO_2$, $Na_2O$, $K_2O$ and $Fe_2O_3$. of which the weight percentage ingredients are as follows:

| | |
|---|---|
| $SiO_2$ | 58~60.5% |
| $Al_2O_3$ | 15.5~16.5% |
| CaO | 14~16% |
| MgO | 6.5~7.8% |
| (CaO + MgO)/MgO | >3 |
| $Li_2O$ | 0.05~0.6% |
| $B_4O_3$ | 0.6~1.5% |
| $TiO_2$ | 0.1~2% |
| $Na_2O$ | 0.1~2% |
| $K_2O$ | 0.1~1% |
| $Fe_2O_3$ | 0.1~1% |

Compared with prior art compositions, the presently described compositions for preparing high-performance glass fiber contain low boron and regulate calcium oxide and magnesia content. The glass fibers manufactured with these compositions not only have good mechanical property but also share similarities with boron-free E glass in the properties of melting, clarification and fiber formability. These compositions are additionally advantageous because they facilitate industrial mass production by tank furnace processes, and with manufacturing costs close to that of conventional E glass.

Exemplary compositions and manufacturing processes within the scope and principles of the present inventions are described below. The present manufacturing processes provide glass samples or working glass made by high-temperature electric furnaces and with natural minerals used as raw materials. The natural minerals include, for example, pyrophillite, kaolin and quartz powder to generate $SiO_2$ and $Al_2O_3$; calcined dolomite or dolomite to generate CaO and MgO; calcined limestone and limestone to generate CaO; borocalcite to generate $B_2O_3$; and spodumene to generate $Li_2O$, etc. A batch of all the components is put into a platinum-rhodium alloy crucible and made into glass samples or product by high-temperature electric furnace. The specific operating conditions of the process and properties of the produced glass, including clarification and forming and liquidus temperatures of each glass formula are studied by comparing different melting time and temperatures for each batch.

Ten examples of production of high performance glass fiber will be described. Each of the samples was prepared in a laboratory by producing glass fragments made in accordance with a composition as listed above. The ingredient mix for each example was placed into a single-hole, platinum-rhodium alloy crucible and heated for 2 hours at to about 100° C. higher than the glass forming temperature. The crucible temperature was then lowered to about 10~20° C. higher than the glass forming temperature. Next a fiber drawing test was conducted. In this process, the temperature of the crucible is strictly controlled, and the state and temperature of fibers were observed in order to achieve the best fiber drawing state. Then the remaining, untested glass monofilaments were collected and tested for strength.

Ten examples of glass fiber made with the presently described compositions and by the above described process are listed in the Table 1 and 2, as C1 to C10. There are two additional embodiments for comparison: traditional E glass and traditional S glass. The content of glass fiber compositions in the table are shown by weight percentage.

The tables also list each of the four basic parameters of (1) forming temperature; (2) liquidus temperature; (3) ΔT value; and (4) monofilament strength.

The above four basic parameters and measurement methods are familiar to technicians in this field. As shown in Tables 1 and 2, the glass fiber compositions of the present invention have a much lower forming temperature and liquidus temperature than S glass. These lower forming temperatures yield numerous advantages, such as meeting the requirements needed for tank furnace production; helping to lower energy consumption; reducing the risk of corrosion of furnace fireproofing materials; and reducing the aging of the crucible well at high temperatures. Compared with traditional E glass, the glass fibers of the present have much higher monofilament strength. As a result, the glass fibers of the present invention provide advantageous balances among the founding and fiber drawing performance of the glass and the mechanical properties of the glass fiber, and they facilitate industrial mass production by tank furnace production processes.

TABLE 1

| | | C1 | C2 | C3 | C4 | C5 | C6 | E glass | S glass |
|---|---|---|---|---|---|---|---|---|---|
| Ingredients | $SiO_2$ | 58.4 | 59.2 | 58.5 | 60.0 | 57.8 | 58.7 | 54.16 | 65 |
| | $Al_2O_3$ | 16.1 | 15.7 | 15.3 | 15.8 | 16.0 | 16.0 | 14.32 | 25 |
| | CaO | 14.7 | 15.6 | 16.1 | 14.55 | 15.6 | 14.0 | 22.12 | — |
| | MgO | 7.3 | 6.8 | 7.5 | 7 | 7.4 | 6.75 | 0.41 | 10 |
| | $B_2O_3$ | 1.1 | 1.0 | 0.9 | 0.5 | 0.8 | 1.2 | 7.26 | — |
| | $Na_2O$ | 1.2 | 0.6 | 0.6 | 0.6 | 1.1 | 1.2 | 0.45 | — |
| | $K_2O$ | 0.22 | 0.22 | 0.22 | 0.24 | 0.22 | 0.24 | 0.25 | — |
| | $Li_2O$ | 0.2 | 0.2 | 0.2 | 0.6 | 0.4 | 0.2 | — | — |
| | $Fe_2O_3$ | 0.35 | 0.34 | 0.34 | 0.36 | 0.34 | 0.36 | 0.35 | Trace amount |
| | $TiO_2$ | 0.35 | 0.34 | 0.34 | 0.35 | 0.34 | 0.35 | 0.34 | — |
| | $F_2$ | — | — | — | — | — | — | 0.29 | — |
| | ZnO | — | — | — | — | — | 1.0 | — | — |
| Parameters | Forming temperature/° C. | 1268 | 1274 | 1278 | 1273 | 1266 | 1272 | 1175 | 1571 |
| | Liquidus temperature/° C. | 1204 | 1210 | 1215 | 1208 | 1208 | 1206 | 1075 | 1470 |
| | ΔT value/° C. | 64 | 63 | 63 | 65 | 58 | 66 | 100 | 99 |
| | Monofilament strength/MPa | 4019 | 4086 | 4062 | 4106 | 3965 | 4056 | 3265 | 4380 |

TABLE 2

| | | C7 | C8 | C9 | C10 | E glass | S glass |
|---|---|---|---|---|---|---|---|
| Ingredients | $SiO_2$ | 57.5 | 61.0 | 58.6 | 59.0 | 54.16 | 65 |
| | $Al_2O_3$ | 16.0 | 15.0 | 15.4 | 15.5 | 14.32 | 25 |
| | CaO | 14.9 | 15.1 | 17.5 | 15.0 | 22.12 | — |
| | MgO | 7.3 | 6.8 | 6.5 | 7.0 | 0.41 | 10 |
| | $B_2O_3$ | 2.0 | 0.5 | 0.5 | 0.5 | 7.26 | — |
| | $Na_2O$ | 0.43 | 0.4 | 0.4 | 0.4 | 0.45 | — |
| | $K_2O$ | 0.22 | 0.22 | 0.22 | 0.22 | 0.25 | — |
| | $Li_2O$ | 0.2 | 0.6 | 0.2 | 0.05 | — | — |
| | $Fe_2O_3$ | 0.35 | 0.34 | 0.34 | 0.33 | 0.35 | Trace amount |
| | $TiO_2$ | 1.1 | 0.34 | 0.34 | 2.0 | 0.34 | — |
| | $F_2$ | — | — | — | — | 0.29 | — |
| | ZnO | — | — | — | — | — | — |
| Parameters | Forming temperature/° C. | 1265 | 1276 | 1267 | 1266 | 1175 | 1571 |
| | Liquidus temperature/° C. | 1200 | 1208 | 1205 | 1203 | 1075 | 1470 |
| | ΔT value/° C. | 65 | 68 | 62 | 63 | 100 | 99 |
| | Monofilament strength/MPa | 3960 | 4186 | 4010 | 4087 | 3265 | 4380 |

Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A composition for preparing high-performance glass fiber comprising by weight percentages:

| | |
|---|---|
| $SiO_2$ | 57.5~62.5% |
| $Al_2O_3$ | 14.5~17.5% |
| CaO | 13.5~17.5% |
| MgO | 6.5~8.5% |
| (CaO + MgO)/MgO | >3 |
| $Li_2O$ | 0.05~0.6% |
| $B_2O_3$ | 0.1~2.0% |
| $TiO_2$ | 0.1~2% |
| $Na_2O$ | 0.1~2% |
| $K_2O$ | 0.1~1% |
| $Fe_2O_3$ | 0.1~1% | wherein the weight percentage of at least one of $Li_2O$, $B_2O_3$ or $TiO_2$ is greater than 0.5% and wherein $2.01 \leq CaO/MgO \leq 2.3$.

2. A composition for preparing high-performance glass fiber comprising by weight percentages:

| | |
|---|---|
| $SiO_2$ | 57.5~62.5% |
| $Al_2O_3$ | 14.5~17.5% |
| CaO | 13.5~17.5% |
| MgO | 6.5~8.5% |
| (CaO + MgO)/MgO | >3 |
| $Li_2O$ | 0.05~0.6% |
| $B_2O_3$ | 0.1~2.0% |
| $TiO_2$ | 0.1~2% |
| $Na_2O$ | 0.1~2% |
| $K_2O$ | 0.1~1% |
| $Fe_2O_3$ | 0.1~1% | wherein the weight percentage of at least one of $Li_2O$, $B_2O_3$ $TiO_2$ is greater than 0.5% and wherein $2.01 \leq CaO/Mg \leq 2.1$.

3. A composition for preparing high-performance glass comprising, by weight percentages:

| | |
|---|---|
| $SiO_2$ | 57.5~62.5% |
| $Al_2O_3$ | 14.5~17.5% |
| CaO | 14~16% |
| MgO | 6.5~7.5% |
| (CaO + MgO)/MgO | >3 |
| $Li_2O$ | 0.05~0.6% |
| $B_2O_2$ | 0.1~2% |
| $TiO_2$ | 0.1~2% |
| $Na_2O$ | 0.1~2% |
| $K_2O$ | 0.1~1% |
| $Fe_2O_3$ | 0.1~1% | wherein the weight percentage of CaO/MgO is 2.01-2.3.

4. A composition for preparing high-performance glass comprising, by weight percentages:

| | |
|---|---|
| $SiO_2$ | 57.5-62.5% |
| $Al_2O_3$ | 14.5-17.5% |
| CaO | 14-16% |
| MgO | 6.5-7.5% |
| (CaO + MgO)/MgO | >3 |
| $Li_2O$ | 0.05-0.6% |
| $B_2O_3$ | 0.1-2% |
| $TiO_2$ | 0.1-2% |
| $Na_2O$ | 0.1-2% |
| $K_2O$ | 0.1-1% |
| $Fe_2O_3$ | 0.1-1% | wherein the weight percentage of CaO/MgO is 2.01-2.1.

5. A composition for preparing high-performance glass fiber comprising by weight percentages:

| | |
|---|---|
| $SiO_2$ | 57.5-62.5% |
| $Al_2O_3$ | 14.5-17.5% |
| CaO | 13.5-17.5% |
| MgO | 6.5-8.5% |
| (CaO + MgO)/MgO | >3 |
| $Li_2O$ | 0.05-0.6% |
| $B_2O_3$ | 0.1-2.0% |
| $TiO_2$ | 0.1-2% |
| $Na_2O$ | 0.1-2% |
| $K_2O$ | 0.1-1% | further comprising ZnO, in an amount of 0.1-4% by weight; wherein the weight percentage of at least one of $Li_2O$, $B_2O_3$ $TiO_2$ is greater than 0.5% and, wherein $2.01 \leq CaO/MgO \leq 2.3$.

6. A composition for preparing high-performance glass fiber comprising by weight; percentages:

| | |
|---|---|
| $SiO_2$ | 57.5-62.5% |
| $Al_2O_3$ | 14.5-17.5% |
| CaO | 13.5-17.5% |
| MgO | 6.5-8.5% |
| (CaO + MgO)/MgO | >3 |
| $Li_2O$ | 0.05-0.6% |
| $B_2O_3$ | 0.1-2.0% |
| $TiO_2$ | 0.1-2% |
| $Na_2O$ | 0.1-2% |
| $K_2O$ | 0.1-1% | further comprising ZnO, in an amount of 0.1-4% by weight; and,
wherein $2.01 \leq CaO/MgO \leq 2.1$.

* * * * *